(12) United States Patent
Bouazizi (10) Patent No.: US 8,935,424 B2
(45) Date of Patent: Jan. 13, 2015

(54) METHOD AND APPARATUS FOR SIGNALING PRESENTATION DESCRIPTION UPDATES IN HTTP STREAMING

(75) Inventor: Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 233 days.

(21) Appl. No.: 13/344,975

(22) Filed: Jan. 6, 2012

(65) Prior Publication Data

US 2012/0198031 A1 Aug. 2, 2012

Related U.S. Application Data

(60) Provisional application No. 61/430,958, filed on Jan. 7, 2011.

(51) Int. Cl.
| | | |
|---|---|---|
| G06F 15/16 | (2006.01) | |
| H04N 21/643 | (2011.01) | |
| H04N 21/84 | (2011.01) | |
| H04N 21/2343 | (2011.01) | |
| H04N 21/845 | (2011.01) | |
| H04L 29/06 | (2006.01) | |
| H04N 21/262 | (2011.01) | |
| H04N 21/6332 | (2011.01) | |
| H04L 29/08 | (2006.01) | |
| H04N 21/236 | (2011.01) | |
| H04N 21/854 | (2011.01) | |

(52) U.S. Cl.
CPC ... *H04N 21/26291* (2013.01); *H04N 21/64322* (2013.01); *H04N 21/84* (2013.01); *H04N 21/23439* (2013.01); *H04N 21/8455* (2013.01); *H04L 65/602* (2013.01); *H04N 21/6332* (2013.01); *H04N 21/85406* (2013.01); *H04L 65/607* (2013.01); *H04L 67/02* (2013.01); *H04N 21/8456* (2013.01); *H04N 21/23614* (2013.01); *H04L 65/4084* (2013.01)

USPC .......................................... 709/231; 709/219

(58) Field of Classification Search
USPC ......... 709/203, 212, 213, 216, 217, 218, 224, 709/231, 232, 233
See application file for complete search history.

(56) References Cited

U.S. PATENT DOCUMENTS

| | | | | |
|---|---|---|---|---|
| 5,287,456 | A | * | 2/1994 | Rhodes et al. ................. 709/228 |
| 5,844,636 | A | * | 12/1998 | Joseph et al. ............. 375/240.26 |
| 6,343,298 | B1 | * | 1/2002 | Savchenko et al. ................... 1/1 |
| 6,369,835 | B1 | * | 4/2002 | Lin ................................ 715/726 |
| 6,937,618 | B1 | * | 8/2005 | Noda et al. ..................... 370/486 |
| 7,020,087 | B2 | * | 3/2006 | Steinberg et al. ............. 370/238 |
| 7,054,949 | B2 | * | 5/2006 | Jennings ........................ 709/238 |

(Continued)

FOREIGN PATENT DOCUMENTS

WO 2012021543 A1 2/2012

OTHER PUBLICATIONS

International Search Report and Written Opinion received for corresponding Patent Cooperation Treaty Application No. PCT/FI2012/050009, dated Apr. 10, 2012, 12 pages.

(Continued)

*Primary Examiner* — Sargon Nano
(74) *Attorney, Agent, or Firm* — Harrington & Smith (57) ABSTRACT

A method comprises updating, by an apparatus, a media presentation description file, associated with media content streamed to one or more client devices using hypertext transfer protocol; and embedding, within one or more media segments of the media content, an indication of the update of the media presentation description file. At least one of the one or more media segments is provided, upon a request, to at least one of the one or more client devices.

24 Claims, 8 Drawing Sheets

(56) References Cited

U.S. PATENT DOCUMENTS

| | | | |
|---|---|---|---|
| 7,076,560 B1* | 7/2006 | Lango et al. | 709/231 |
| 7,096,481 B1* | 8/2006 | Forecast et al. | 725/32 |
| 7,240,358 B2* | 7/2007 | Horn et al. | 725/87 |
| 7,809,851 B2* | 10/2010 | Klemets | 709/231 |
| 2001/0033586 A1* | 10/2001 | Takashimizu et al. | 370/535 |
| 2003/0236912 A1* | 12/2003 | Klemets et al. | 709/236 |
| 2005/0091190 A1* | 4/2005 | Klemets | 707/1 |
| 2005/0102371 A1* | 5/2005 | Aksu | 709/217 |
| 2005/0262187 A1* | 11/2005 | Klemets | 709/203 |
| 2006/0092822 A1* | 5/2006 | Klemets | 369/275.1 |
| 2007/0011344 A1* | 1/2007 | Paka et al. | 709/231 |
| 2008/0137541 A1* | 6/2008 | Agarwal et al. | 370/241 |
| 2009/0106443 A1* | 4/2009 | Klemets | 709/231 |
| 2010/0121976 A1* | 5/2010 | Qi et al. | 709/231 |
| 2011/0307581 A1* | 12/2011 | Furbeck et al. | 709/219 |
| 2012/0042090 A1* | 2/2012 | Chen et al. | 709/231 |

OTHER PUBLICATIONS

3GPP S4-100589, "MPD Update in HTTP Streaming", Aug. 16-20, 2010, Erlangen, Germany, Chapter 2, 5 pages.

3GPP S4-100080, "Media Presentation Description in HTTP Streaming", Jan. 25-29, 2010, St Julian, Malta, Chapter 2.5-2.6, 12 pages.

3GPP S4-100185, "Updates to Adaptive HTTP Streaming", Jan. 25-29, 2010, St Julian, Malta, Chapters 12.2.2.4, 12 pages.

Qualcomm Incorporated; "Use Cases for Rel-10 Adaptive HTTP Streaming"; 3GPP Draft S4-100580; 3GPP TSG-SA4#60, Aug. 16-20, 2010, Erlangen, Germany; whole document (11 pages).

Qualcomm Incorporated; "Support of Push Updates in DASH"; 3GPP Draft S4-100800; 3GPP TSG-SA4#61, Nov. 8-12, 2010, Barcelona, Spain; whole document (4 pages).

3GPP TS 26.234 V9.5.0; "$3^{rd}$ Generation Partnership Project; Technical Specification Group Services and System Aspects; Transparent end-to-end Packet-switched Streaming Service (PSS); Protocols and codecs (Release 9)"; Dec. 2010; pp. 1-188.

Telefon AB LM Ericsson et al.; "Media Presentation Description in HTTP Streaming"; 3GPP Draft S4-100080; 3GPP TSG-SA4#57, Jan. 25-29, 2010, St. Julian, Malta, whole document (11 pages).

* cited by examiner

METHOD AND APPARATUS FOR SIGNALING PRESENTATION DESCRIPTION UPDATES IN HTTP STREAMING

RELATED APPLICATION

This application claims priority to U.S. Application No. 61/430,958 filed Jan. 7, 2011, which is incorporated herein by reference in its entirety.

TECHNICAL FIELD

The present application relates generally to streaming data and, more particularly, to streaming via Hyper Text Transport Protocol (HTTP).

BACKGROUND

Traditionally, Transmission Control Protocol (TCP) has been recognized as having drawbacks when used for the delivery of real-time media, such as audio and video content. The drawbacks of TCP relate, for example, to the aggressive congestion control algorithm and the retransmission procedure that TCP implements. In TCP transmissions, the sender reduces the transmission rate upon recognition of a congestion event through, for example, packet loss or excessive transmission delays. The transmission throughput of TCP may behave like a saw-tooth shape. The TCP protocol tolerates delivery delays in favor of reliable and congestion-aware transmission. In contrast, streaming applications are delay sensitive.

SUMMARY

Various aspects of examples of the invention are set out in the claims.

According to a first aspect of the present invention, a method comprises updating, by an apparatus, a media presentation description file, associated with media content streamed to one or more client devices using hypertext transfer protocol; and embedding, within one or more media segments of the media content, an indication of the update of the media presentation description file. At least one of the one or more media segments is provided, upon a request, to at least one of the one or more client devices.

According to a second aspect of the present invention, an apparatus comprises at least one processor; and at least one memory including computer program code, the at least one memory and the computer program code configured to, with the at least one processor, cause the apparatus to perform at least the following: update, by an apparatus, a media presentation description file, associated with media content streamed to one or more client devices using hypertext transfer protocol; and embed, within one or more media segments of the media content, an indication of the update of the media presentation description file. At least one of the one or more media segments is provided, upon a request, to at least one of the one or more client devices.

According to a third aspect of the present invention, a computer-readable medium including computer executable instructions which, when executed by a processor, cause an apparatus to perform at least the following: update, by an apparatus, a media presentation description file, associated with media content streamed to one or more client devices using hypertext transfer protocol; and embed, within one or more media segments of the media content, an indication of the update of the media presentation description file. At least one of the one or more media segments is provided, upon a request, to at least one of the one or more client devices.

According to a fourth aspect of the present invention, an apparatus comprises means for updating, by an apparatus, a media presentation description file, associated with media content streamed to one or more client devices using hypertext transfer protocol; and means for embedding, within one or more media segments of the media content, an indication of the update of the media presentation description file. At least one of the one or more media segments is provided, upon a request, to at least one of the one or more client devices.

According to a fifth aspect of the present invention, a method comprises fetching, by a client device, one or more media segments using a media presentation description file according to hypertext transfer protocol; detecting an indication of an update associated with the media presentation description file, said indication being embedded in at least one fetched media segment; and processing the detected indication.

According to a sixth aspect of the present invention, an apparatus comprises at least one processor; and at least one memory including computer program code, the at least one memory and the computer program code configured to, with the at least one processor, cause the apparatus to perform at least the following: fetching, by a client device, one or more media segments using a media presentation description file according to hypertext transfer protocol; detecting an indication of an update associated with the media presentation description file, said indication being embedded in at least one fetched media segment; and processing the detected indication.

According to a seventh aspect of the present invention, a computer-readable medium including computer executable instructions which, when executed by a processor, cause an apparatus to perform at least the following: fetching, by a client device, one or more media segments using a media presentation description file according to hypertext transfer protocol; detecting an indication of an update associated with the media presentation description file, said indication being embedded in at least one fetched media segment; and processing the detected indication.

According to an eighth aspect of the present invention, an apparatus comprises means for fetching, by a client device, one or more media segments using a media presentation description file according to hypertext transfer protocol; means for detecting an indication of an update associated with the media presentation description file, said indication being embedded in at least one fetched media segment; and means for processing the detected indication.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and their potential advantages are understood by referring to FIGS. 1-6 of the drawings.

The transmission control protocol (TCP) has drawbacks when used for delivery of real-time media. Recently, the trend has shifted towards the deployment of the Hyper Text Transport Protocol (HTTP) as the preferred protocol for the delivery of multimedia content over the Internet. HTTP runs on top of TCP and is a textual protocol. This shift may be attributable to the ease of deployment of HTTP. There is no need to deploy a dedicated server for delivering the content. Further, HTTP is typically granted access through firewalls and NATs, which significantly simplifies the deployment.

An Adaptive HTTP Streaming (AHS) solution has been standardized recently by the 3rd Generation Partnership Project (3GPP), and the same solution has been adopted by several other standardization bodies, such as MPEG and OIPF.

Figure 1:
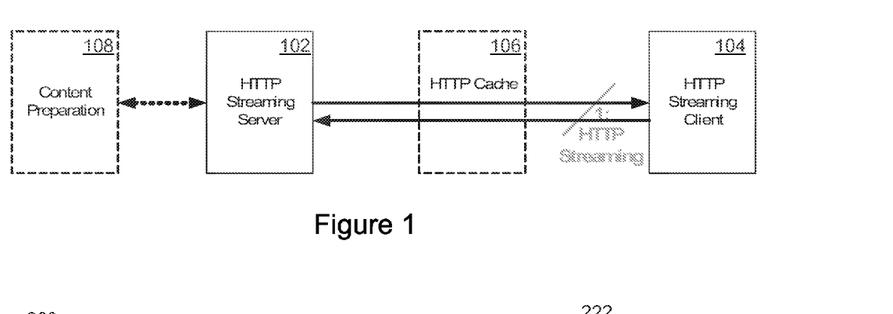
FIG. 1 illustrates an example system architecture for HTTP streaming and/or adaptive HTTP streaming.

Referring now to FIG. 1, an example of system architecture associated with HTTP streaming and/or adaptive HTTP streaming is illustrated. In the system, an HTTP content server 102 provides content to one or more streaming clients, such as HTTP streaming client 104. The media content may be transmitted directly to the HTTP clients from the HTTP content server 102. Alternatively an intermediate web cache, or HTTP cache 106, may be used for temporarily storing media content. The streaming client 104 may be any of a variety of devices, such as a mobile handset, a laptop, a personal computer (PC), a tablet device, a set-up box, a personal digital assistant (PDA) device, a media player or other communication device.

In HTTP streaming and/or adaptive HTTP streaming, media content is prepared. The media content preparation may be performed by a separate entity, such as content preparation module 108 illustrated in FIG. 1, by the HTTP streaming server 102, and/or by both entities together. In preparing the media content, the content is segmented into multiple segments. An initialization segment is created to carry the information necessary to configure the media player to allow the streaming client 104 to consume the media content.

The media content is encoded in one or more representations. Different representations of the media content correspond to, for example, different encoding bitrates, different languages associated with the media content, different compression formats, and/or the like. The content representations may be alternatives to each other. For example, the client may select only one alternative out of the group of alternative representations. In other embodiments, the content representations may complement each other. The client may elect to add complementary representations that contain additional media components, for example.

Figure 2:
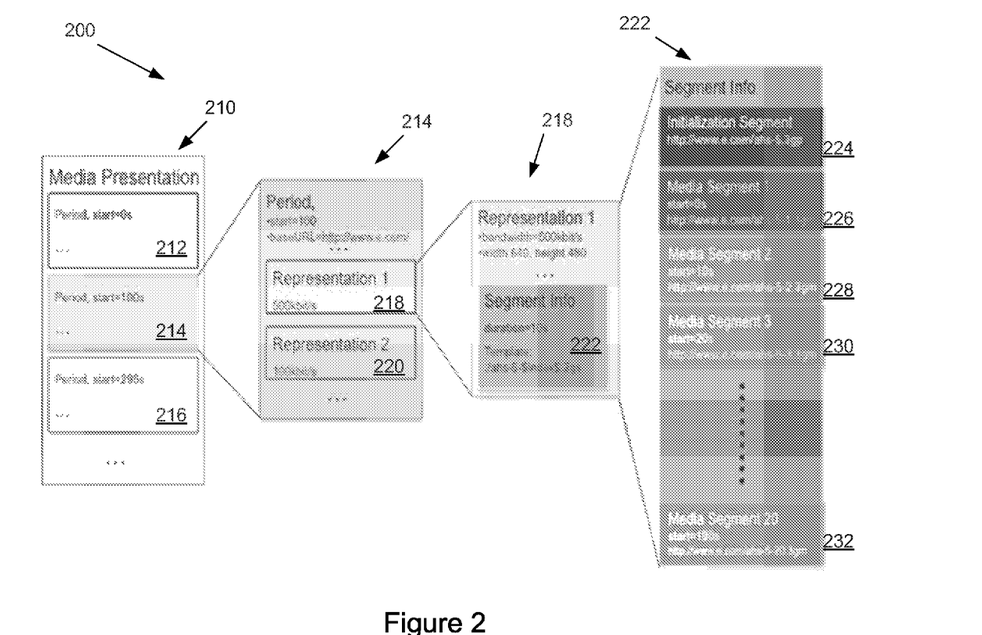
FIG. 2 illustrates an example structure of a Media Presentation Description (MPD) file.

The media content offered is described to the client using a media presentation description (MPD) file. FIG. 2 illustrates an example structure of a MPD file. The MPD is, for example, an extensible markup language (XML) file that contains a description of the content, the periods of the content, e.g., 212, 214, and 216, and the representations of the content, e.g., 218 and 220. The MPD also includes information about how to access each piece of the content. A MPD element 210 is the main element in the MPD file 200. It contains general information about the content, such as its type and the time window during which the content is available. The MPD contains one or more periods 212, 214, 216, each of which describes a time segment of the content. Each Period may contain one or more representations of the content. As illustrated in FIG. 2, Period 214 contains at least two representations 218, 220. Each representation is an encoding of the content with a different configuration. Representations may differ in various respects, such as bandwidth requirements, the media components they contain, the codecs in use, or languages, for example.

Each representation includes information which enables the streaming client to consume the content. For example, as illustrated in FIG. 2, the representation 218 contains segment information 222. The segment information 222 includes an initialization segment 224, and one or more media segments 226-232. In the illustrated embodiment, each media segment 226-232 has a start time for the media of that particular segment and references a location for the content.

Figure 3:
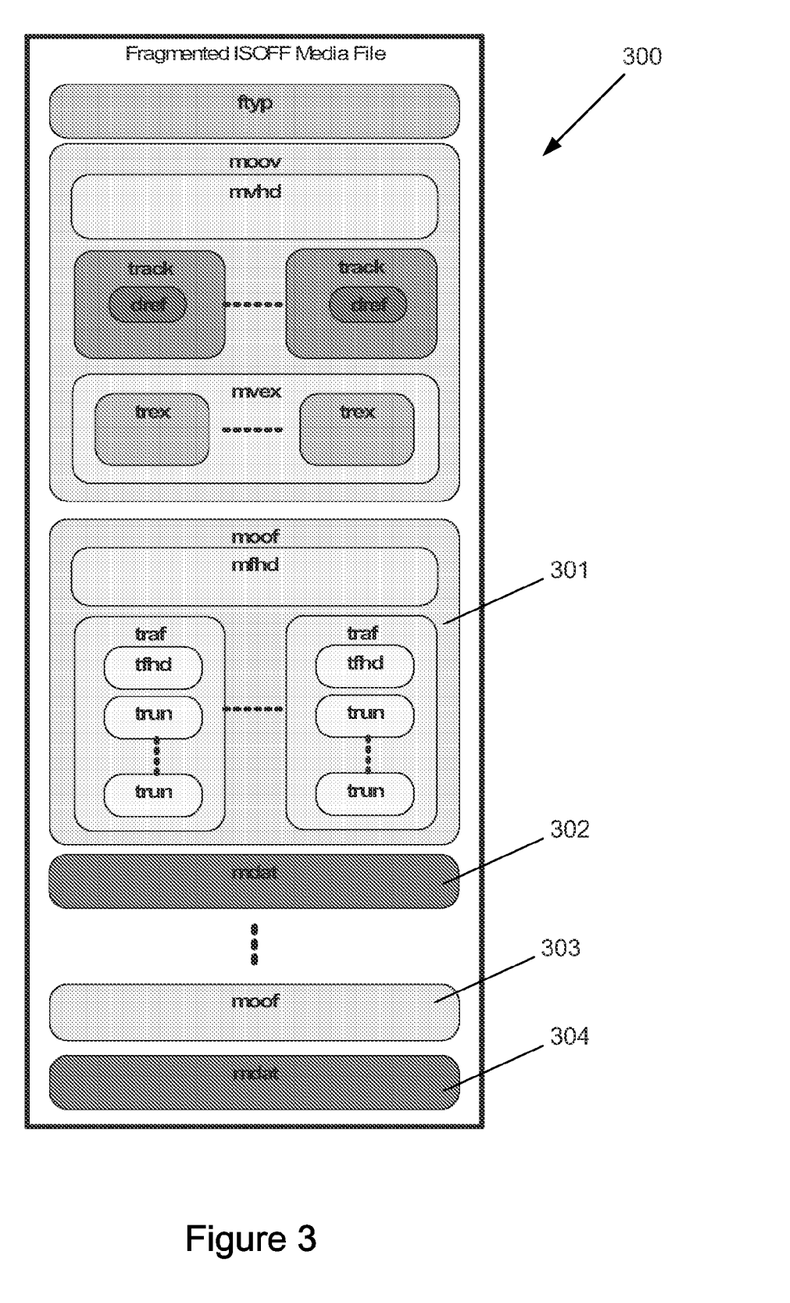
FIG. 3 illustrates an example of an ISO base media file format.

In one embodiment, the MPD file is formatted according to the ISO-base file format and its derivates, e.g., the MP4 and the 3GPP file formats. FIG. 3 illustrates an example of an ISO base media file format. The content is stored in so-called movie fragments. Each movie fragment contains the media data 302, 304 and the corresponding meta-data 301, 303. The media data 302, 304 is typically a collection of media samples from all media components of the representation. Each media component is described as a track of the file.

As noted above, the media content offered, for HTTP streaming and/or adaptive HTTP streaming, is described to the client using a description file, called MPD file, an example of which is illustrated in FIG. 2. In certain cases, the media presentation may change during the streaming session, as may be the case, for example, for live content. In such cases, the user devices receiving the media stream must become aware of the change. For example, when streaming a sports event or game, the MPD file may be updated based, at least in part, on the circumstances of the game and the change in the media content to be streamed, e.g., adding an advertisement during a time-out in the game, announcing the start of the period following the game when the ending time of the game becomes known and/or the like. Changes to the media content and corresponding changes in the MPD file may be initiated based on other reasons and/or facts not necessarily limited to sports games.

One way to ensure that user devices are made aware of the changes to the session is by having all user devices periodically check for a new MPD or an MPD update. However, this method has drawbacks such as significant traffic unnecessarily generated due to polling, clients cannot tell for sure if they get a fresh copy or a stale copy of the MPD file due to uncontrolled caching and propagation scenarios in the distribution network and clients might get the MPD file at significantly different time instants, which may result in fully unsynchronized playback at different clients, even exceeding acceptable tolerance skews.

Alternatively, clients that have faced a download problem may be required to fetch a new MPD file before continuing the consumption of the service. This method should be considered as a last resort since it only happens after an error in the download, thereby adversely affecting the user experience.

In accordance with certain embodiments of the present invention, an indication of the change in the description and/or content of the streamed data is signaled to the user devices as, for example, by signaling an update in the MPD file. The signaling is done in-band within media segments. For example, an indication of the update in the MPD file may be provided to client devices as part of the meta-data of one or more media segments in the media stream.

In accordance with one embodiment, the signaling of the MPD file update may further include signaling the number of remaining media segments that are still accessible using a prior version of the MPD file that is being used prior to the update. In this regard, a client device cannot use the prior version of the MPD file to access/fetch a media segment that follows the signaled number of remaining segments. Thus, a user device may receive the indication of the change and must fetch the MPD update and/or the updated MPD file before the end of a current period defined based, at least in part, on the signaled remaining media segments. The updated MPD describes the current period either by signaling the number of remaining media segments accessible using a prior version of the MPD file or by signaling the time remaining till the start of the first media segment that is not accessible/fetchable using the prior version of the MPD file, eg., the MPD file used before the update.

In one embodiment, the signaling of the indication of the change is done as part of the Segment Index Box (sidx) box as follows:

```
aligned(8) class SegmentIndexBox extends FullBox('sidx',
version, 0) {
    unsigned int(32) reference_track_ID;
    unsigned int(16) track_count;
    unsigned int(16) reference_count;
    for (i=1; i<= track_count; i++)
    {
        unsigned int(32)         track_ID;
        if (version==0)
        {
            unsigned int(32)        decoding_time;
        } else
        {
            unsigned int(64)        decoding_time;
        }
    }
    for(i=1; i <= reference_count; i++)
    {
        bit (1)          reference_type;
        unsigned int(31)         reference_offset;
        unsigned int(32)         subsegment_duration;
        bit(1)          contains_RAP;
        unsigned int(31)         RAP_delta_time;
    }
    int(16) segments_to_end_of_period;
}
```

In the above example, a new field, underlined above, is added to the sidx box to signal the number of segments until the end of the period. The number of segments may explicitly include the current segment and the last segment. A zero or negative value is used to indicate that the value is unknown at the moment.

In another example, the signaling may be provided as part of a new box. For example:

```
aligned(8) class MPDUpdateInformationBox extends
FullBox('mpui', version, 0) {
    unsigned int(16) segments_to_end_of_period;
}
```

In accordance with another embodiment, the signaling of the MPD update may be performed by signaling the presence of a new MPD and an indication of the time it will become effective. In this regard, the presence of an MPD may be signaled by a flag and a time in the media presentation timeline by when the new MPD must be fetched. In this regard, the signaling box may include the time until the new MPD becomes effective or when the new MPD is required. In one example, the box may be defined as follows:

```
aligned(8) class MPDUpdateInformationBox extends
FullBox('mpui', version, 0) {
    unsigned int(32) milliseconds_to_new_mpd;
    unsigned int(16) mpd_version;
}
```

The field milliseconds_to_new_mpd gives the time by which all clients must have received and processed the new MPD. In addition, the box may contain a version number of the new MPD file.

In accordance with still another embodiment, the signaling of the MPD update may be performed by embedding the updated MPD in the media segment. While this may result in bulky media segments, with each media segment containing the updated MPD file, it is effective in signaling the change without requiring the client device to fetch the update. In this case, the MPD file may be embedded as part of a metadata box "meta" with appropriate type indication to signal the presence of an MPD. In such case, the new MPD becomes effective immediately after the current media segment.

Figure 4:
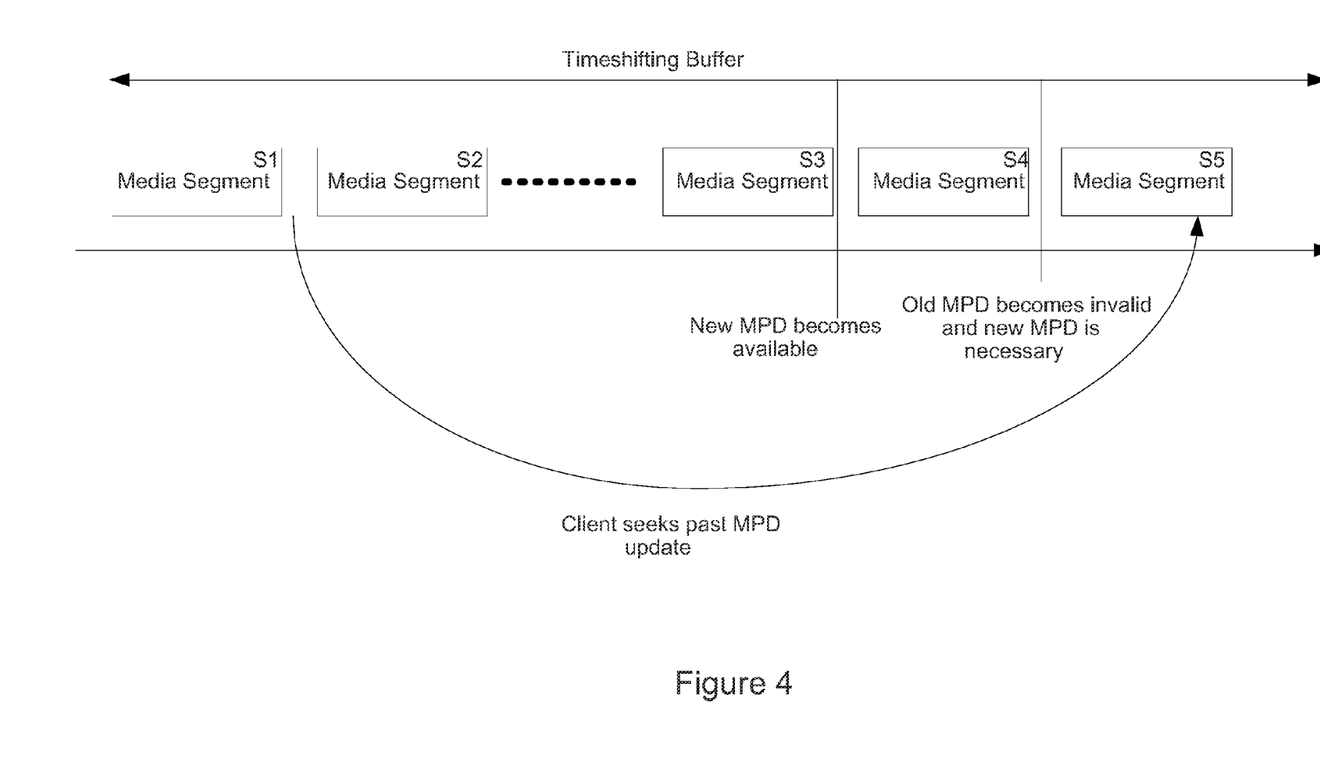
FIG. 4 is an illustration of a media stream in accordance with one embodiment.

In some cases, a user may be consuming the streamed media and may time-shift past the indication of the change. One such scenario is illustrated in FIG. 4. The user may be consuming the media stream through a timeshifting buffer. After consuming media segment S1, the user may seek forward, skipping media segments from S2 to S4. In doing so, the user may skip over and miss the signaling of an indication of the MPD update. The user device may face a situation where the updated MPD file is not fetched and the old MPD becoming invalid. This may result in the client not being aware of the MPD update, and the user may experience an error when attempting to consume media segment S5.

In accordance with embodiments of the present invention, this error may be avoided by retrospectively inserting the signaling to all media segments that are part of the time shifting range, e.g. media segments with start playback time prior to current time instance. Thus, in the example of FIG. 4, each of media segments S4 and prior media segments, e.g., S3, S2 and S1, to the end of the timeshifting buffer, may be provided with the signaling of the change. Alternatively, the client may be instructed to fetch a new MPD whenever it performs a seek forward that involves downloading new media segments.

Figure 5:
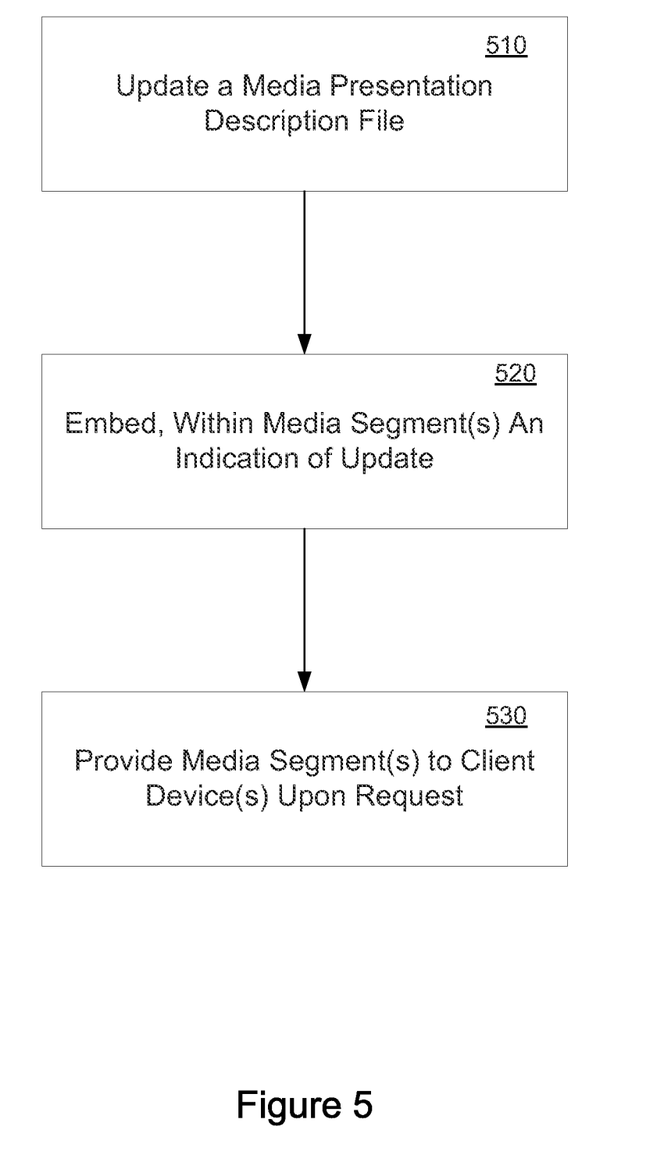
FIG. 5 is a flow chart illustrating a method according to one embodiment.

Referring now to FIG. 5, a flow chart illustrates a method according one embodiment. In accordance with the method of FIG. 5, a media presentation description (MPD) file may be updated by an apparatus such as, for example, an HTTP server or a content provider server (block 510). As noted above, the MPD file is associated with media content that is streamed to client devices, and the update to the MPD file may reflect a change in the media presentation.

An indication of the update to the MPD file is embedded within one or more media segments of the media content (block 520). As described above, the indication may include signaling of the availability of the updated MPD file, the updated MPD file (or a portion thereof), an indication of the number of remaining media segments available using the previous MPD file, time remaining until the start of the first media segment using the updated MPD file and/or an identifier of the version of the file for the updated MPD file.

Upon receiving a request, the one or more media segments with the embedded indication of the update of the MPD file may be provided to client devices (block 530). Thus, the update to the MPD file may be signaled to the client devices.

Figure 6:
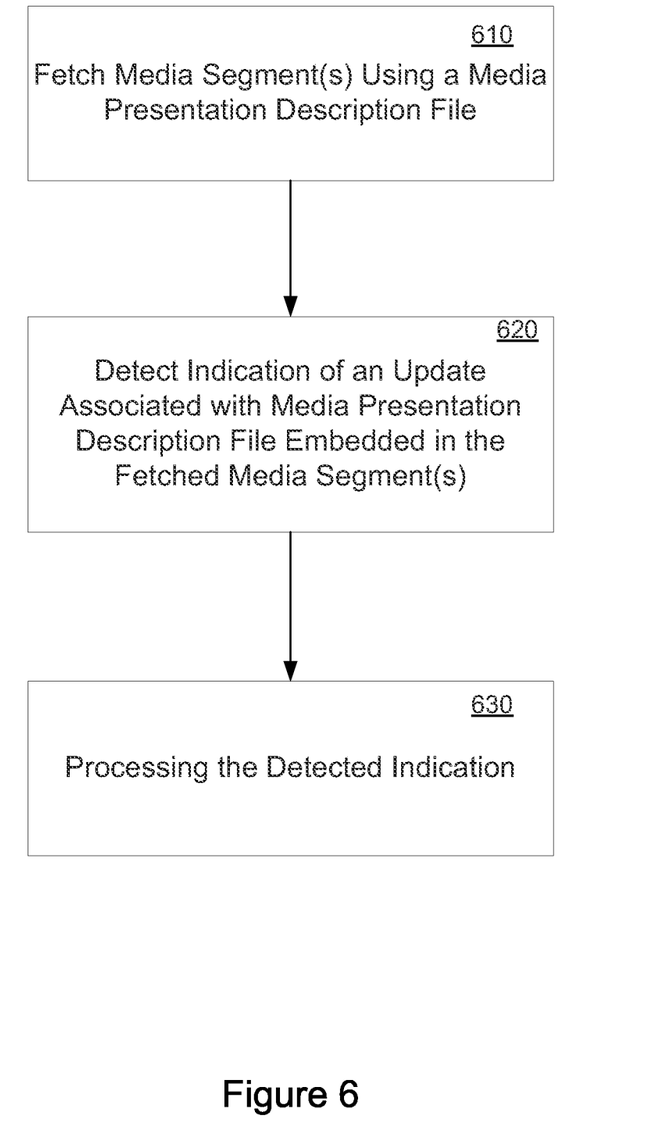
FIG. 6 is a flow chart illustrating a method according to another embodiment.

Referring now to FIG. 6, a flow chart illustrates a method according another embodiment. In accordance with the method of FIG. 6, a client device, such as a mobile communication device, fetches one or more media segments using an MPD file (block 610). As noted above, the media segments may be fetched/received via HTTP. An indication of an update associated with the MPD file is detected by the client device (block 620). The indication may be embedded in one or more of the fetched media segments. The client device processes the detected indication of the update associated with the MPD file by, for example, reading at least one portion of the MPD file and fetching at least one more media segment using the updated media presentation file (block 630).

Thus, embodiments of the present invention ensure fast access to MPD updates. The user devices can immediately discover the existence f an MPD update. Further, the need to poll the server for MPD updates may be eliminated. Advantages of example embodiments of the present invention include, among others, the availability of a new, or updated, MPD file is signaled explicitly and in a reliable way to all clients, the likelihood of fetching a stale copy of the MPD file is avoided or significantly minimized. In addition the playback at the client devices is done in a way that minimizes the live delay, yet not resulting in buffer underflows. Furthermore, the signaling of MPD updates is robust enough to cater for clients that are operating in the time-shifting mode and clients are able to detect the safe playout delay compared to the live content instant.

Figure 7:
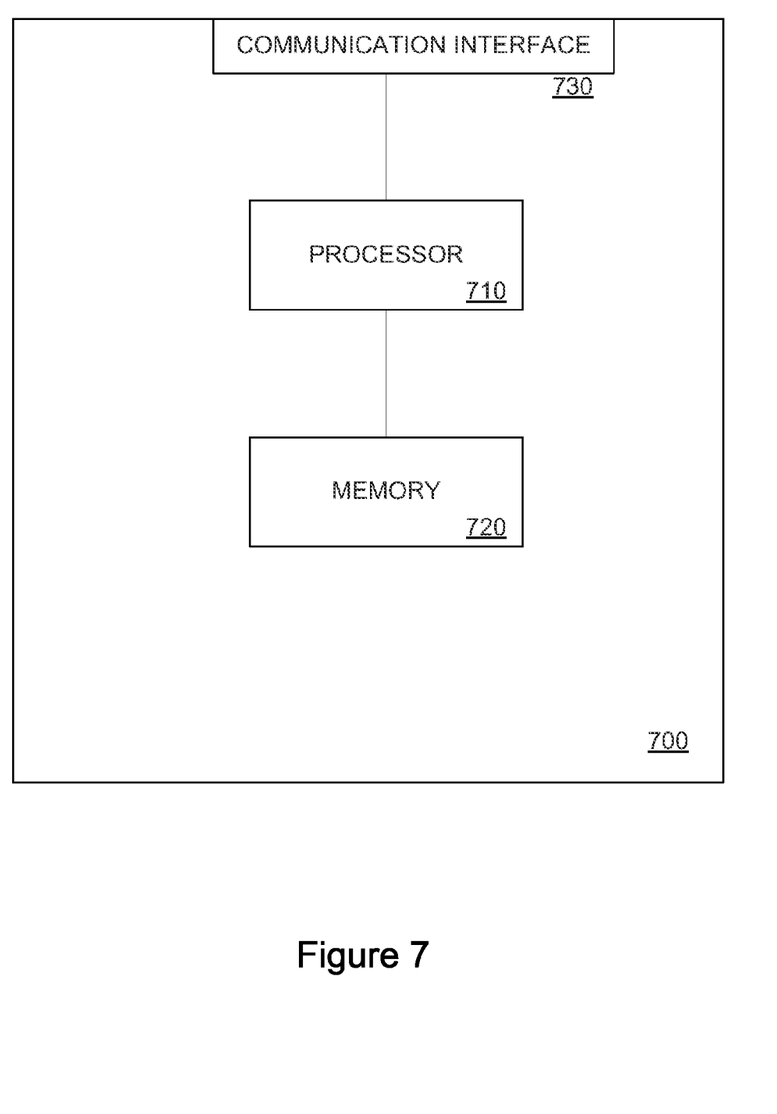
FIG. 7 is a schematic illustration of server device according to one embodiment.

Referring now to FIG. 7, a server device according to one embodiment is schematically illustrated. The server device 700 may be any of a variety of types of servers. In various embodiments, the server device 700 is an HTTP server or a content provider server. The server device 700 includes one or more processors, such as the processor 710. The processor 710 may be configured to execute computer executable instructions which may be stored on one or more memory devices, such as memory device 720. Execution of the computer executable instructions by the processor 710 may cause the server to perform a method, such as the method described above with reference to FIG. 5. The server device 700 further includes a communication interface 730, allowing the server device 700 to communicate with various other communication devices. For example, the server device 700 may communicate with various client devices through, for example, a communication network.

Figure 8:
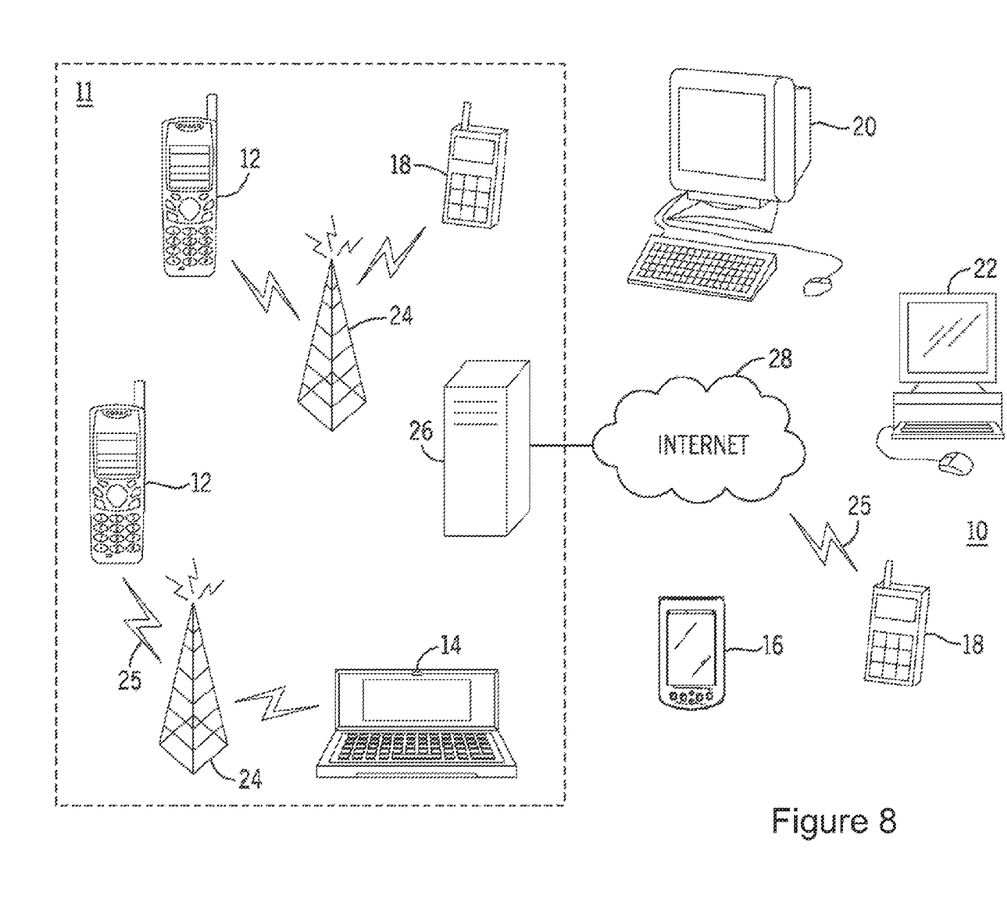
FIG. 8 is an overview diagram of a system within which various embodiments may be implemented.

FIG. 8 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 8 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 9:
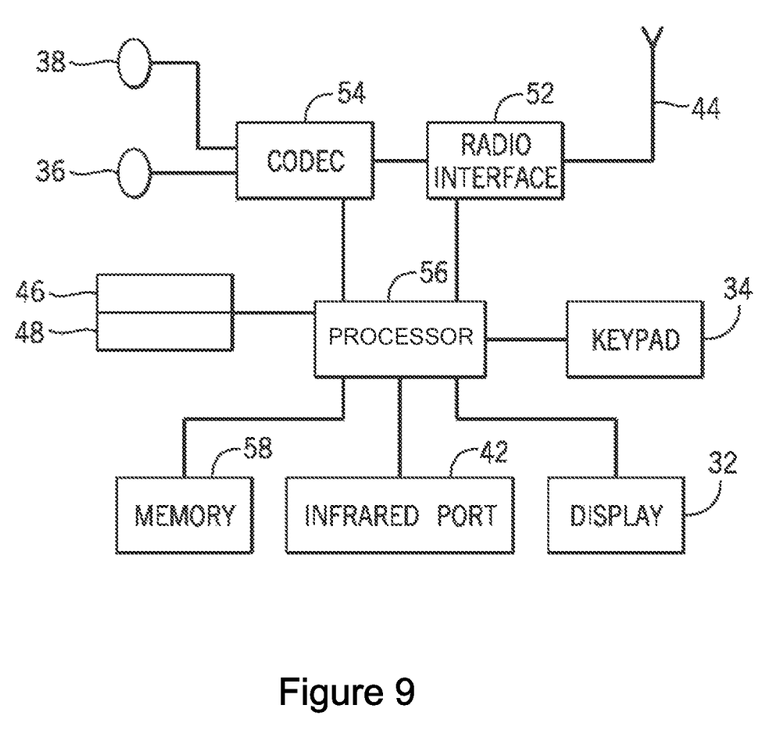
FIG. 9 is a schematic representation of the circuitry which may be included in an exemplary electronic device which may be utilized in accordance with the various embodiments.

FIG. 9 shows one representative electronic device which may be used in accordance to the various embodiments of the present invention. In embodiments of the present invention, the device of FIG. 9 may be representative of a client device, a streaming server or a network device. It should be understood, however, that the scope of the present invention is not intended to be limited to one particular type of device. The electronic device of FIG. 9 may includes a housing, a display in the form of a liquid crystal display, a keypad 34, a microphone 36, an ear-piece 38, a battery, an infrared port 42, an antenna 44, a smart card 46 in the form of a UICC according to one embodiment, a card reader 48, radio interface circuitry 52, codec circuitry 54, one or more processors, such as processor 56, and one or more memories, such as memory 58. The above described components enable the electronic device to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 9. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    updating, by an apparatus, a media presentation description file associated with media content streamed to one or more client devices using hypertext transfer protocol; and embedding, within one or more media segments of the media content, an indication of the update of the media presentation description file,
    wherein at least one of the one or more media segments is provided, upon a request, to at least one of the one or more client devices, and
    wherein the indication comprises an indication signaled within metadata of the one or more media segments of the media content.

2. The method as claimed in claim 1, wherein the indication comprises indication embedded in one or more media segments accessible using a prior media presentation description file, said prior presentation description being used prior to said updated media presentation description file.

3. The method as claimed in claim 1, wherein the indication comprises:
    a signaling of the availability of the updated media presentation description file;
    at least one portion of the updated media presentation description file;
    an indicator of a number of remaining media segments that are still accessible using a prior media presentation description file, said prior media presentation description file being in use by a client device, prior to the updated media presentation description file, to fetch media segments;
    time remaining until the start of the first media segment that is accessible using only the updated media presentation description file; and
    an identifier of a version for the updated media presentation description file.

4. The method as claimed in claim 3, wherein the indication comprises one of:
    said indicator of the number of remaining media segments and wherein said number of remaining media segments varies based, at least in part, on the media segment in which the indication is embedded; and
    said time remaining and wherein said time remaining varies based, at least in part, on the media segment in which the indication is embedded.

5. An apparatus, comprising:
    at least one processor; and
    at least one memory including computer program code, the at least one memory and the computer program code configured to, with the at least one processor, cause the apparatus to perform at least the following:
    update, by an apparatus, a media presentation description file associated with media content streamed to one or more client devices using hypertext transfer protocol; and
    embed, within one or more media segments of the media content, an indication of the update of the media presentation description file,
    wherein at least one of the one or more media segments is provided, upon a request, to at least one of the one or more client devices, and
    wherein the indication comprises an indication embedded in one or more media segments accessible using a prior media presentation description file, said prior presentation description being used prior to said updated media presentation description file.

6. The apparatus as claimed in claim 5, wherein the indication comprises indication embedded in one or more media segments accessible using a prior media presentation description file, said prior presentation description being used prior to said updated media presentation description file.

7. The apparatus as claimed in claim 5, wherein the indication comprises:
    a signaling of the availability of the updated media presentation description file;
    at least one portion of the updated media presentation description file;
    an indicator of a number of remaining media segments that are still accessible using a prior media presentation description file, said prior media presentation description file being in use by a client device, prior to the updated media presentation description file, to fetch media segments;

time remaining until the start of the first media segment that is accessible using only the updated media presentation description file; and an identifier of a version for the updated media presentation description file.

8. The apparatus as claimed in claim 7, wherein the indication comprises one of:

said indicator of the number of remaining media segments and wherein said number of remaining media segments varies based, at least in part, on the media segment in which the indication is embedded; and said time remaining and wherein said time remaining varies based, at least in part, on the media segment in which the indication is embedded.

9. The apparatus as claimed in claim 5, wherein said apparatus comprises one of:

a hypertext transfer protocol server; and a content provider server.

10. A computer-readable memory including computer executable instructions, said computer executable instructions, when executed by a processor, cause an apparatus to perform a method as claimed in claim 1.

11. A method, comprising:

updating, by an apparatus, a media presentation description file associated with media content streamed to one or more client devices using hypertext transfer protocol;

embedding, within one or more media segments of the media content, an indication of the update of the media presentation description file, wherein at least one of the one or more media segments is provided, upon a request, to at least one of the one or more client devices, wherein the indication comprises an indication signaled within metadata of the one or more media segments of the media content, fetching, by at least one of the one or more client devices, at least one of the one or more media segments using the media presentation description file according to hypertext transfer protocol;

detecting, by the at least one of the one or more client devices, the indication of the update associated with the media presentation description file; and processing, by the at least one of the one or more client devices, the detected indication.

12. The method as claimed in claim 11, wherein the detected indication comprises:

indication received within metadata of said at least one fetched media segment; and indication embedded in one or more media segments accessible using a prior media presentation description file, said prior presentation description being used prior to said updated media presentation description file.

13. The method as claimed in claim 11, wherein the indication comprises:

a signaling of the availability of the updated media presentation description file;

at least one portion of the updated media presentation description file;

an indicator of a number of remaining media segments that are still accessible using a prior media presentation description file, said prior media presentation description file being in use by a client device, prior to the updated media presentation description file, to fetch media segments;

time remaining until the start of the first media segment that is accessible using only the updated media presentation description file; and an identifier of a version for the updated media presentation description file.

14. The method as claimed in claim 13, wherein the indication comprises one of:

said indicator of the number of remaining media segments and wherein said number of remaining media segments varies based, at least in part, on the media segment in which the indication is embedded; and said time remaining and wherein said time remaining varies based, at least in part, on the media segment in which the indication is embedded.

15. The method as claimed in claim 11, wherein processing the indication comprises:

reading at least one portion of the media presentation description file; and fetching at least one more media segment using the updated media presentation description file.

16. The method as claimed in claim 15, wherein processing the indication further comprises fetching the updated media presentation description file, from a network server.

17. An apparatus, comprising:

at least one processor; and at least one memory including computer program code, the at least one memory and the computer program code configured to, with the at least one processor, cause the apparatus to perform at least the following:

update, by an apparatus, a media presentation description file associated with media content streamed to one or more client devices using hypertext transfer protocol;

embed, within one or more media segments of the media content, an indication of the update of the media presentation description file, wherein at least one of the one or more media segments is provided, upon a request, to at least one of the one or more client devices, and wherein the indication comprises an indication embedded in one or more media segments accessible using a prior media presentation description file, said prior presentation description being used prior to said updated media presentation description file fetching, by at least one of the one or more client devices, at least one of the one or more media segments using the media presentation description file according to hypertext transfer protocol;

detecting, by the at least one of the one or more client devices, the indication of the update associated with the media presentation description file; and processing, by the at least one of the one or more client devices, the detected indication.

18. The apparatus as claimed in claim 17, wherein the detected indication comprises:

indication received within metadata of said at least one fetched media segment; and indication embedded in one or more media segments accessible using a prior media presentation description file, said prior presentation description being used prior to said updated media presentation description file.

19. The apparatus as claimed in claim 17, wherein the indication comprises:

a signaling of the availability of the updated media presentation description file;

at least one portion of the updated media presentation description file;

an indicator of a number of remaining media segments that are still accessible using a prior media presentation description file, said prior media presentation description file being in use by a client device, prior to the updated media presentation description file, to fetch media segments;

time remaining until the start of the first media segment that is accessible using only the updated media presentation description file; and an identifier of a version for the updated media presentation description file.

20. The apparatus as claimed in claim 19, wherein the indication comprises:

said indicator of the number of remaining media segments and wherein said number of remaining media segments varies based, at least in part, on the media segment in which the indication is embedded; and said time remaining and wherein said time remaining varies based, at least in part, on the media segment in which the indication is embedded.

21. The apparatus as claimed in claim 17, wherein processing the indication comprises:

reading at least one portion of the media presentation description file; and fetching at least one more media segment using the updated media presentation description file.

22. The apparatus as claimed in claim 21, wherein processing the indication further comprises fetching the updated media presentation description file, from a network server.

23. The apparatus as claimed in claim 17, wherein said client device comprises one of a mobile phone, a personal computer, a laptop, a tablet device, a set-up box, a personal digital device and a media player.

24. A computer-readable memory including computer executable instructions, said computer executable instructions, when executed by a processor, cause an apparatus to perform a method as claimed in claim 11.

* * * * *